United States Patent [19]

Shashidhar et al.

[11] Patent Number: 5,828,432
[45] Date of Patent: Oct. 27, 1998

[54] CONDUCTING SUBSTRATE, LIQUID CRYSTAL DEVICE MADE THEREFROM AND LIQUID CRYSTALLINE COMPOSITION IN CONTACT THEREWITH

[75] Inventors: Ranganathan Shashidhar, Springfield; Jeffrey M. Calvert; Renate J. Crawford, both of Alexandria; Kenneth J. Wynne, Falls Church; Terrence G. Vargo, Fairfax Station, all of Va.; Alan G. MacDiarmid; Jamshid K. Avlyanov, both of Drexel Hill, Pa.

[73] Assignees: The United States of America as represented by the Secretary of the Navy, Washington, D.C.; GEO-Centers, Inc., Newton Centre, Mass.; The Trustees of the University of Pennsylvania, Philadelphia, Pa.

[21] Appl. No.: 882,297

[22] Filed: Jun. 25, 1997

Related U.S. Application Data

[63] Continuation of Ser. No. 401,912, Mar. 9, 1995, abandoned.

[51] Int. Cl.[6] .................................................. G02F 1/1343
[52] U.S. Cl. .......................................................... 349/139
[58] Field of Search ............................... 359/54, 87, 265, 359/269, 271, 254, 270; 257/40; 252/500, 510, 511; 349/139, 143

[56] References Cited

U.S. PATENT DOCUMENTS

| | | | |
|---|---|---|---|
| 3,955,881 | 5/1976 | Yaguchi et al. | 359/74 |
| 4,608,129 | 8/1986 | Tamamura et al. | 204/18.1 |
| 4,679,043 | 7/1987 | Morokawa | 359/53 |
| 5,079,600 | 1/1992 | Schnur et al. . | |
| 5,118,538 | 6/1992 | Escher et al. . | |
| 5,252,695 | 10/1993 | Niciri et al. . | |
| 5,293,261 | 3/1994 | Shashidhar et al. . | |
| 5,324,591 | 6/1994 | Georger et al. . | |
| 5,342,737 | 8/1994 | Georger et al. . | |
| 5,391,463 | 2/1995 | Ligler et al. . | |
| 5,510,628 | 4/1996 | Georger et al. . | |
| 5,552,216 | 9/1996 | Sugimoto et al. | 428/328 |

FOREIGN PATENT DOCUMENTS

| | | | |
|---|---|---|---|
| 1167737 | 7/1989 | Japan | 359/269 |
| 2216127 | 8/1990 | Japan | 359/82 |

OTHER PUBLICATIONS

Cao et al, *Appl. Phys. Lett.*, vol. 60, pp. 2711–2713, (1992).
Schadt et al, *Appl. Phys. Lett.*, vol. 18, pp. 127–128 (1971).
"Grant and HacGh's Chemical Dictionary", Grant et al, 1987 McGraw Hill.
Kirk–Othmer, *Encyclopedia of Chemical Technology*, vol. 18, 3rd Edition, pp. 755–793, (1982).
MacDiarmid, in *Conjugated Polymers and Related Materials*, "The Polyanilines: A Novel Class of Conducting Polymers", Chapter 6, Oxford University Press, pp. 73–98 (1993).
Manohar et al, *Synthetic Metals*, "Polyaniline" Pernigraniline, an Isolable Intermediate in the Conventional Chemical Synthesis of Emeraldine, vol. 41–43, pp. 711–714, (1991).
Gregory et al, *Synthetic Metals*, "Conductive Textiles", vol. 28, pp. C823–C835, (1989).
Vargo et al, *J. of Polymer SCI.: Part a: Polym. Chem.*, "Hydrogen/Liquid/Vapor Radio Frequency Glow Discharge Plasma Oxidation/Hydrolysis of Expanded Poly(Tetrafluoroethylene) (ePTFE) and Poly(Vinylidene Fluoride) (PVDF) Surfaces", vol. 29, pp. 555–570, (1991).

(List continued on next page.)

*Primary Examiner*—William L. Sikes
*Assistant Examiner*—James A. Dudek
*Attorney, Agent, or Firm*—Oblon, Spivak, McClelland, Maier & Neustadt, P.C.

[57] ABSTRACT

Conducting substrate for use in display device having a conducting polymer on the surface of a rigid or flexible, flat, curved or bent substrate.

38 Claims, 7 Drawing Sheets

OTHER PUBLICATIONS

Vargo et al, *Science*, "Adhesive Electroless Metallization of Fluoropolymeric Substrates", vol. 262, pp. 1711–1712, (1993).

MacDiarmid et al, *Mat. Res. Soc. SYMP.*, "Conducting Polymers: Past, Present and Future . . . ", vol. 328, pp. 133–144, (1994).

Vargo et al, *Langmuir*, "Monolayer Chemical Lithography and Characterization of Fluoropolymer Films", vol. 8, pp. 130–134, (1992).

Calvert, *J. Vac. SCI. Technol. B*, "Lithographic Patterning of Self–Assembled Films", vol. 11, pp. 2155–2163, (1993).

Scheffer et al in *Liquid Crystals: Applications and Uses*, B. Bahader, Ed., vol. 1, p. 231, World Scientific (1990).

Doane, J.W. in *Liquid Crystals: Applications and Uses*, B. Bahader, Ed., vol. 1, p. 361, World Scientific (1990).

Dijon, J. in *Liquid Crystals: Applications and Uses*, B. Bahader, Ed., vol. 1, p. 305, World Scientific (1990).

CONDUCTING SUBSTRATE, LIQUID CRYSTAL DEVICE MADE THEREFROM AND LIQUID CRYSTALLINE COMPOSITION IN CONTACT THEREWITH

This application is a Continuation of application Ser. No. 08/401,912, filed on Mar. 9, 1995, now abandoned.

BACKGROUND OF THE INVENTION

1. Field of the Invention

The present invention relates to conducting substrates for use in, e.g., liquid crystalline devices, to liquid crystalline devices comprising conducting substrates and to liquid crystalline compositions in contact with conducting substrates.

2. Discussion of the Background

Liquid crystalline-based display devices generally rely upon the application of an electrical field to a liquid crystalline compound or liquid crystalline composition. This electric field is typically generated by using substrates which encase the liquid crystalline compound/composition and which have on their surface a conducting layer of indium tin oxide (ITO). The substrates typically are made of glass and have a thin layer of ITO coated directly thereon. Common liquid crystalline devices in use today comprise two such substrates coated with ITO and having a liquid crystalline compound/composition sandwiched therebetween. When a voltage is applied to the conducting surfaces of the substrates the electric field passing through the liquid crystal compound/composition exerts an orienting effect which can block or transmit light passing through the liquid crystalline compound/composition depending upon the particular characteristics of the given device.

The fabrication of ITO coatings on, e.g., glass is carried out at temperatures on the order of 250° C. in order to provide an acceptably short deposition time. While this process has received wide acceptance, a serious problem is encountered when relatively low melting point materials (e.g., polymers, etc.) are to be used as a base for conducting substrates. Further, ITO coatings on e.g., flexible substrates are brittle, and they fail by, e.g., cracking when the substrate on which it is deposited is purposefully flexed or bent, or when the substrate undergoes dimensional change due to thermal gradients, etc. While conducting polymers have been mentioned as candidates for substrates this has never been realized. See Cao et al, *App. Phys. Lett* 60, 271, 1992.

SUMMARY OF THE INVENTION

Accordingly, one object of this invention is to provide a novel electrode substrate for use in display devices such as liquid crystalline display devices, electrochromic display devices, etc. which are flexible, bendable and/or which may be provided in various curved shapes while avoiding the problems encountered with ITO coatings.

Another object of this invention is to provide colored or transparent, preferably transparent, films of conducting polymers on substrate bases so as to provide conducting electrode substrates for use in display devices, etc.

Another object of this invention is to provide a method for preparing lightweight, transparent or colored electrode substrates comprising a layer of conducting polymer at low cost using room temperature processing and simple manufacturing steps such as dipping or coating from solution.

Another object of this invention is to provide a curved and/or flexible display device having flat and/or curved surfaces for use in automobile windshields and moon/sun roofs, aircraft canopies, helmet visors, television screens, etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention, which relates to conducting substrates and their use in display devices such as liquid crystal devices, comprises a substrate, which may be made of any material, and which is coated with a layer of conducting polymer. The conducting substrates are useful as electrodes in display devices. The substrate is preferably one capable of maintaining its shape at temperatures of 100° C. and greater and may be transparent, translucent or opaque, and may be colored or colorless. Preferably, the substrate is flexible and/or curved and may be made of glass or plastic, preferably silica glass, pyrex glass, poly(ethyleneterephthalate) (PET), Mylar, hexafluoropropylene-co-tetrafluoroethylene (fluorinated ethylene propylene or FEP), poly(meth)-$C_1$–$C_{16}$ acrylate, poly(meth)acrylic acid, polyethers, polyethyleneoxide, polycarbonates, polyimines, polyamines, polyesters etc. Alternatively, the substrate may be bent. Bendable materials useful as substrates in the present invention include metals such as copper, aluminum, etc., glass, etc. If the substrate is electrically conducting, an insulating material such as a non-conductive polymer may be placed between the substrate and the conducting polymer.

The substrate may be of any thickness, such as, for example $1 \times 10^{-8}$ cm–1 cm including all values in between and all ranges therebetween. Thicker and thinner layers may be used. The substrate need not have a uniform thickness. The preferred shape is square or rectangular, although any shape may be used. Before the substrate is coated with conducting polymer it may be physically and/or optically patterned, for example by rubbing, by the application of an image, by the application of patterned electrical contact areas, by the presence of one or more colors in distinct regions, etc., or may be treated by radio frequency glow discharge treatment, etc.

The conducting electrode substrates of the present invention further comprise an electrically conducting polymer on a surface of the substrate. The conducting polymer is a layer deposited directly on the substrate and/or deposited on any material which has first been applied to the substrate. The term "on a surface of the substrate" as used herein refers to both situations. Any thickness of conducting polymer can be used. Preferably, the conducting polymer is formed as a layer having a thickness of from 1–1000 nanometers, more preferably 5–100 nm including all values and ranges therebetween. The conducting polymer layer need not form an integral whole, need not have a uniform thickness and need not be contiguous with the base substrate. In fact, in a preferred embodiment, the conducting polymer layer is formed in a pattern on the substrate base.

Figure 1:
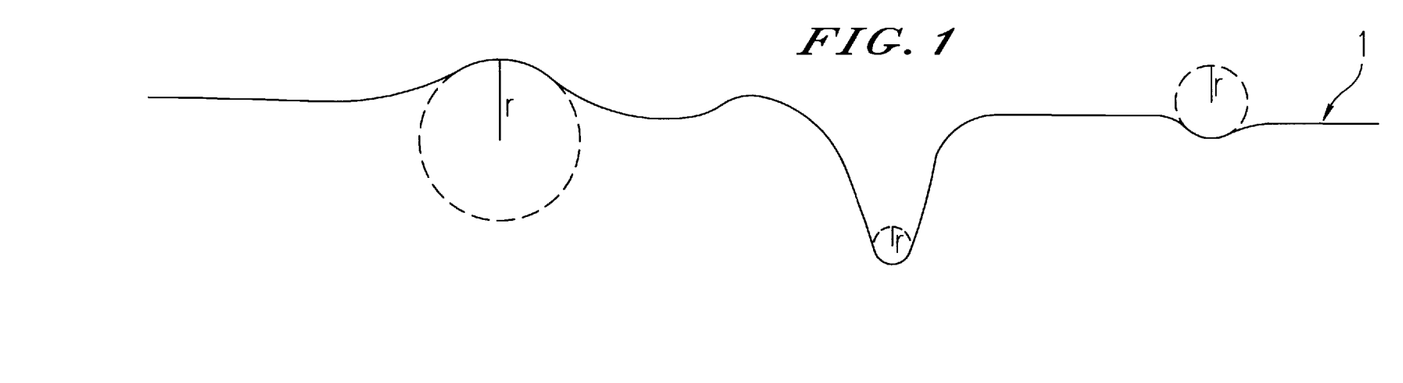
FIG. 1 shows a conducting polymer-coated substrate 1 according to the present invention and radius of curvature r.
Figure 2A:
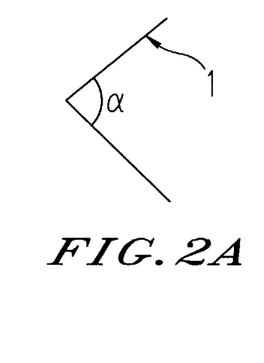
FIGS. 2a and 2b shows a conducting polymer-coated substrate 1 according to the invention and angle α.
Figure 2B:
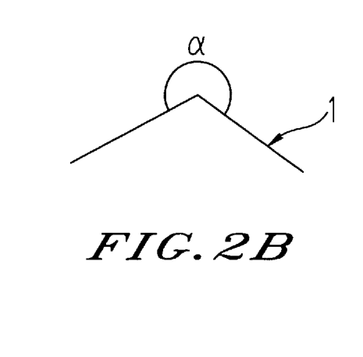

The invention conducting electrode comprising a substrate base and a layer of conducting polymer may be formed into any desired shape. As shown in FIG. 1, the generally planar electrode substrate 1 (shown in cross-section) may be curved in any manner desirable. The curvature of the substrate can be characterized by a radius of curvature r, depicted in FIG. 1. r may have any value since the electrode substrates according to the present invention may be flat or may be curved to any desired degree. Preferred values of r are from 0.01 mm–1,000 mm, including all values therebetween and all ranges therebetween. In addition, the electrode substrates according to the present invention may be bent so as to form an angle. As shown in FIG. 2 this angle ($\alpha$) may be any angle of from 0°–360°, including all angles therebetween and all ranges therebetween. In both FIGS. 2a and 2b the substrate 1 has, on the surface indicated by the arrow, a conducting polymer layer. The conducting electrode substrates of the present invention are not limited to articles of manufacture wherein a substrate has on only one of its surfaces a conducting polymer but includes conducting electrodes wherein a base substrate has conducting polymer on more than one surface thereof. For example, a conducting electrode according to the invention could be prepared where a base substrate is coated with conducting polymer on the side to which the arrow points in FIG. 1 as well as to the opposite side.

The conducting polymer layer of the present invention preferably comprises aniline, pyrrole, thiophene, dithiophene, etc., monomers, and is preferably a homopolymer of these monomers (polyaniline, polypyrrole, polythiophene, polydithiophene, etc.). Derivatives of these monomers can also be used. Any derivative that produces a conducting polymer can be used. Such derivatives include the $C_1$–$C_{10}$ alkyl-, $C_1$–$C_{10}$ alkoxy-, halo-, nitro-, cyano-, ester-, etc., substituted monmoners. These monomers are commercially available or made by simple organic reactions well within the skill of the ordinary artisan. Mixtures may be used. The conducting polymer layer preferably has a conductivity ranging from 0.01 S/cm to $5 \times 10^3$ S/cm, including all conductivity values therebetween and all ranges therebetween. The conducting polymer film is preferably doped with any type of a salt, such as an anthroquinone salt, in any amount including amounts of 1 mole of salt for every 1–10, preferably every 2–3, moles of monomeric units constituting the conducting polymer. Other conducting polymers and dopant salts which may be used in the present invention conducting electrodes are those described in the Kirk-Othmer *Encyclopedia of Chemical Technology*, vol. 18, 3ed., p. 755–793, John Wiley & Sons, Inc., 1982, incorporated herein by reference.

The conducting polymer of the present invention may be applied to a surface of the substrate or to any material, layer, etc. present on the base substrate by any method known in the art. A preferred method according to the present invention is an in situ deposition method wherein the substrate to be coated, optionally having any further material on the surface thereof which is intended to be over-coated with conducting polymer, is placed in an aqueous solution of monomer(s) which form a conducing polymer layer as they undergo polymerization. See, for example, A. G. MacDiarmid in "Conjugated Polymers and Related Materials", Ch. 6, W. R. Salanek et al, Eds., Oxford University Press, 1993, A. G. MacDiarmid et al, MRS PROC. Boston, Nov. 1993, Manohar et al, *Bull. Am. Phys. Soc.*, 34, 582 (1989), Manohar, S. K. et al, *Synth. Met.*, 241–43, 711 (1991) and Manohar, S. K., Ph.D. Dissertation, University of Pennsylvania, 1992, all incorporated herein by reference.

Generally, in the invention method an aqueous solution is prepared by dissolving in water one or more types of monomer which, when polymerized, form a conducting polymer in an amount of from about 0.01 g–50 g/100 ml. For, e.g., polypyrrole films in a separate container, ferric chloride is dissolved in water in an amount of from 0.1 g–35 g/100 ml. A dopant salt may be added to the ferric chloride solution, for example, anthraquinone-2-sulfonic acid sodium salt (AQ2SA) in amounts of from 0.1–10 g/100 ml of ferric chloride solution. If desired, a second, third, etc., dopant salt, such as, for example, 5-sulfosalicylic acid sodium salt (SSA) may be added to the ferric chloride solution in an amount of from 0.1–10 g/100 ml.

The substrate to be coated with conducting polymer is placed in the ferric chloride solution optionally containing one or more dopant salts in a manner such that the substrate is covered by solution on those surfaces where the conducting polymer film is desired. The aqueous monomer solution is then added to the ferric chloride solution into which the substrate has been placed, and the substrate is removed after an appropriate amount of time depending on the thickness, etc. of the conducting polymer layer desired. Typical time periods for immersion range from about 1–60 minutes. The monomer solution can be added to the ferric chloride solution before the substrate is dipped therein. After the desired conducting polymer layer has been deposited on a surface of the substrate, the substrate is removed and washed with distilled water and, if desired, may be sonicated in methyl/alcohol for cleaning. The substrate is then dried, for example, in air. For, e.g., polyaniline films the procedure and amounts are similar. Aniline is dissolved in 0.1–5M orthophosphoric acid, and a second solution of 0.001–1M ammonium metavanadate in 0.1–5M orthophosphoric acid is prepared. The two solutions are cooled to −10°–10° C. and combined. The substrate is placed in the combined solutions for deposition and then optionally placed in a solution of 1–50 ml aniline in 500 ml 0.1–2 HCl at 0° C. to reduce any pernigraniline polymer. The substrate is then washed in 0.1–2M HCl and dried. The HCl tends to exchange orthophosphate anions for chloride ions in the deposited film. More than one monomer may be used in the monomer solution and the thickness of the deposited conducting polymer film may be measured by using an atomic force microscopy instrument. Typical surface resistivities obtained by the above-described methods range from 5 to $1 \times 10^5$ ohms/square. Bulk conductivities typically range from 10–1000 s/cm.

Thus the deposition of the conducting polymer layer on the substrate in the present invention is easily controlled by varying the concentration of monomer, polymerization initiator, optional dopant salt, etc. in solution as well as the time the base substrate is present therein. In this manner the thickness, transparency, physical characteristics, etc. of the deposited conducting polymer layer can be controlled.

The invention conducting substrates are preferably used in optical recording media and devices such as liquid crystalline devices comprising one or more conducting electrodes. The present invention conducting electrodes may simply be substituted for any one or more conducting electrodes present in such prior art devices. As mentioned above, curved, flexible or permanently or impermanently bent displays are particularly preferred, but flat-panel displays, particularly those having large areas, are also preferred.

The invention conducting substrates preferably have at least one electric lead attached to (in contact with) the conducting polymer material on the substrate for the application of current, voltage, etc. to said conducting polymer (i.e. electrically connected). The lead(s) is/are preferably not in electrical contact with the substrate or any material applied to said substrate other than the conducting polymer and may be made of patterned deposited metal, may be a simple wire in contact with the conducting polymer, etc. Devices according to the invention preferably also include a current or a voltage source electrically connected to the conducting electrode through the lead(s). A power source, battery, etc. may be used.

Prior art devices which are improved by substituting at least one invention conducting substrate electrode for an existing conducting substrate include displays, spatial light modulators, phase shifting devices, non-linear optical devices, twisted nematic devices, supertwisted nematic devices, double layer supertwisted nematic devices, triple layer supertwisted nematic devices, active matrix displays, multiplexed versions of the above-described devices, etc. In addition, polymer dispersed liquid crystal (PDLC) devices surface stabilized ferroelectric liquid crystal (SSFLC) devices, electrically controlled birefringence (ECB) devices and memory devices using smectic or nematic liquid crystals are preferred. If desired, the conducting polymer of the present invention conducting electrode substrate may be modified to provide alignment of, e.g., liquid crystalline molecules, by, for example, rubbing, by the alignment technique described in U.S. Ser. No. 08/375,997 filed Jan. 20, 1995), etc. In addition, the conducting polymer can be applied in a pattern on the base substrate. The method described in U.S. Ser. No. 08/308,917, filed Dec. 20, 1994 can be used. Both the above-identified applications are incorporated herein by reference.

Liquid crystalline materials useful in display devices comprising one or more conducting electrode substrates according to the present invention are not particularly limited and includes those exhibiting nematic, cholesteric, smectic, discotic, etc. phases, including ferroelectric materials (particularly those with lateral fluorine substitution). The liquid crystals may be used singly or in mixture, including eutectic mixtures. Superfluorinated nematic mixtures may be used. Compositions comprising two or more different liquid crystalline materials are preferred. Examples of liquid crystals and their mixtures are described in *Liquid Crystals in Tabellen,* VOLS. I and II VEB Deutscher Verlag fur Grundstoffindustrie, Leipzig, Germany, 1974 and 1984 both volumes incorporated herein by reference, in U.S. Pat. No. 5,032,099, incorporated herein by reference, etc. Guest host compositions may also be used wherein mixtures of liquid crystal(s) with, e.g., dyes, non-linear optical compounds, etc. are provided.

The present invention will now be further described by reference to Examples. The invention is not limited to the Examples.

General Method for Film Deposition

POLYPYRROLE FILMS 0.6 ml of pyrrole (monomer) was dissolved under magnetic stirring in 100 ml of distilled water (200 ml beaker, room temperature) during 15 minutes. 3.5 g of ferric chloride was dissolved under magnetic stirring in 100 ml of distilled water in 400 ml beaker. After 5 minutes stirring at room temperature 0.98 g of Anthraquinone-2-sulfonic acid sodium salt (AQ2SA) was added to the 100 ml of ferric chloride solution. This solution was stirred for 5 more minutes. After complete dissolving of AQ2SA 5.34 g of 5-sulfosalicylic acid sodium SSA was placed into above solution. After addition of SSA, the solution became red in color. The solution (mixture) was stirred for 5 more minutes in order to dissolve SSA completely.

A substrate (overhead transparency, FEP, pyrex glass or polymethylmethacrylate sheet) was situated by using plastic clamps above ($FeCl3+AQ2SA+SSA$) solution level inside the 400 ml beaker.

100 ml of pyrrole solution was added quickly (during 1–2 seconds) into the beaker containing mixture of $FeCl3+AQ2SA+SSA$. Simultaneously at that moment a stop watch was started. During dipping (reaction) time substrates were immersed completely into polymerizing solution. After 1–60 minutes of reaction, substrates with thin polyppyrrole films on them were removed from the polymerizing solution and immediately washed in the 400 ml beaker with 300 ml of distilled water for 20 minutes. The polypyrrole deposit was rinsed with distilled water for 2–3 minutes. If necessary substrate was sonicated for 30 seconds in an 80 ml beaker containing 40 ml of methyl alcohol. The deposit on the substrate was then dried under air flow for 20 minutes.

POLYANILINE FILM

Aniline (Aldrich Company) was freshly distilled under vacuum prior to use. All other chemical were of the highest grade and used as received. Deionized, filtered water (Fisher Company) was used in all studies. Commercially available glass microscope slides were used as substrates without any additional treatment.

A solution was made containing 2 mL (0.02M) aniline in 100 mL of 4M orthophosphoric acid at room temperature. Another solution was made containing 1.2 g (0.01M) of ammonium metavanadate in 100 mL of 4M orthophosphoric acid at room temperature. Both solutions were stirred for 10 minutes and then cooled to $-2C$. in an ice bath. Using plastic clamps, several substrates were suspended in 400 mL beaker containing 100 mL of the magnetically stirred ammonium metavanadate/orthophoshoric acid solution. The dipping solution was prepared by pouring the 100 mL solution containing aniline into this beaker. Dipping times were registered relative to the time of initial mixing of the aniline/orthophosphoric acid and ammonium metavanadate/orthophosphoric acid solutions. Substrates on which polyaniline films were being deposited were withdrawn form the dipping solution at different time intervals and quickly placed in a beaker containing a solution of 10 mL aniline in 500 mL 1M HCl at 0° C. This step reduced any oxidized pernigraniline form of polymer in the emeraldine oxidation state. After soaking for 30 minutes, the substrates covered with the films were washed for 60 seconds in 1M HCl and then placed in a solution of 1M HCl at room temperature for 30 minutes. The substrates were subsequently washed again in 1M HCl for 30 seconds and dried using an air jet for 20 minutes. The HCl tended to exchange orthophospospate anions to chloride anions in the deposited polyaniline films.

General Method for Determination of Film Thickness

Films were deposited on a commercial (NASHUA R brand) overhead transparency substrates to which a strip of commercial adhesive tape had previously been affixed. After washing and drying as described above and recording the vis/UV spectra for each deposit (varying from 2 to 60 minutes) the thickness of the same sample was determined as follows: the adhesive tape was carefully removed from the substrate thus exposing the substrate on which the polymer had not been deposited. The thickness of the deposited film was measured by an Atomic Force Microscopy instrument (Nanoscope III model). From the above data, a working curve plotting thickness vs. minimum optic absorbance (at 600 mm) was constructed to facilitate rapid estimation of film thickness for future studies.

EXAMPLE A1
(Substrate: Untreated Glass Microscope Slide)

By using the procedure described above for depositing polypyrrole, a polypyrrole film was deposited into microscope glass slide (no cleaning of substrate).

Reaction conditions: Dipping time 5 minutes (at room temperature).

Results: $R_s=7.4\times10^3$ ohm/square $\delta=100$ s/cm; $T=1.2\times10^{-6}$ cm;

where: $R_s$ is surface resistivity(ohms/square) $\delta$ is bulk conductivity.

T is thickness in cm.

EXAMPLE A2
(Substrate: Hydrophobic Microscope Slide)

Using procedure from example A1, a polypyrrole film was deposited onto a hydrophobic microscope glass slide (treated with 1,1,1,3,3,3,-hexamethyl disilazane).

Reaction conditions: Dipping time was 10 minutes.

Results: $R_s=1.4\times10^3$ ohms/square; $\delta=232$ s/cm; $T=3\times10^{-6}$ cm.

EXAMPLE A#
Substrate: Overhead transparency: Water Contact Angle −110°

Using procedure from Example A1, a polypyrrole film was deposited onto the non-treated substrate.

Dipping time: 5 minutes.

Results: $R_s=1.4\times10^3$ ohms/square; $\delta=235$ s/cm; $T=3\times10^{-6}$ cm.

EXAMPLE A4
(Substrate: Radio Frequency Glow Discharge Modifed FEP; Water Contact Angle Approx. 65.60)

Polypyrrole was deposited on FEP as in example A1.

Dipping time: 5 minutes.

Results: $R_s=2\times10^3$ ohms/square; $\delta=327\times$/cm; $T=1.4\times10^{-6}$ s/cm

EXAMPLE A5
(Substrate: Radio Frequency Glow Discharge Modified FEP; Water Contact Angle −56°)

Procedure as in example A1. Deposition onto treated FEP.

Dipping time 30 minutes.

Results: $R_s=687$ ohms/square; $\delta=362$ s/cm; $T=4\times10^{-6}$ cm;

EXAMPLE A6
(Substrate: Untreated Polymethylmethacrylate Sheet)

Exactly as in Example A1,

Dipping time: 10 minutes

Results $R_s$ $1.3\times10^3$ ohms/square $\delta=380$ s/cm $T=2\times10^{6-}$ cm;

EXAMPLE A7
(Substrate: Untreated Overhead Transparency)

Exactly as in Example A1

Substrate: Overhead transparency Nashua® brand

Results: $R_s$ $2.3\times10^3$ ohms/square $\delta=190$ s/cm $T=2\times10^{-6}$ cm;

EXAMPLE A8
(Substrate: Specially Cleaned Flat Pyrex Glass)

Substrate Pyrex glass (cleaned in 50% $NH_4OH$ at 60° C. and then in 0.25 NaOH).

Dipping time: 10 minutes

Results: $R_s=3\times10^3$ ohms/square $\delta=230$ s/cm $T=1.4\times10^{-6}$ cm;

EXAMPLE A9
(Substrate: Non-cleaned Pyrex Glass)

Pyrex glass not cleaned

Results: $R_s=1.8\times10^3$ ohms/square $\delta=260$ s/cm $T=2\times10^{-6}$ cm;

EXAMPLE 2

Fabrication of Polyaniline Films on PET/FEP Substrates

Figure 3:
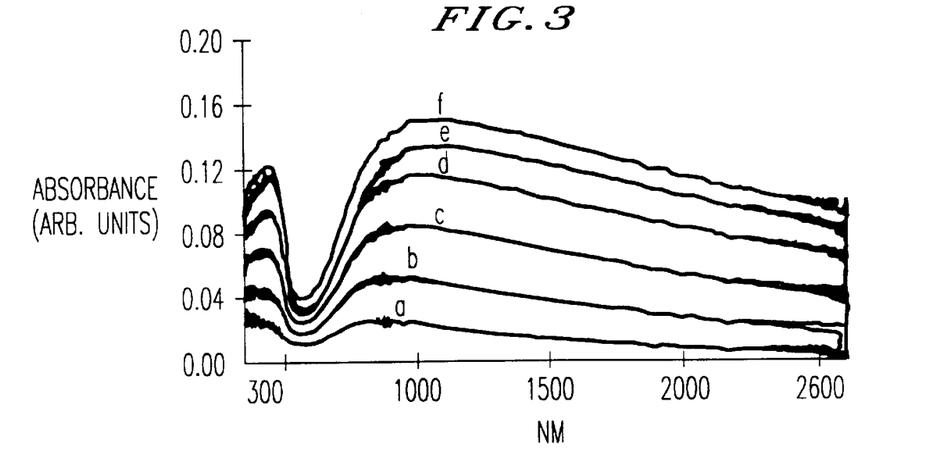
FIG. 3 shows the optical absorption and conductivity for substrates according to the invention.

Polyaniline films were deposited on PET or FEP by the in-situ deposition method described in Example 1. The surface resistance as well as the optical absorption of the deposited films was varied by deposition conditions. The efficacy of this process to control both the electrical conductivity and the optical absorption (and hence optical transmission) is shown by the data in FIG. 3. Strongly adhering doped polyaniline films ranging from 50 to 300 Angstroms thick with conductivity ranging from 0.1 S/cm to 5.0 S/cm were obtained. Typical optical transparency was about 60% for films on PET while it was about 80% for films on FEP.

EXAMPLE 3

Polypyrrole Films on PET/FEP

Figure 4:
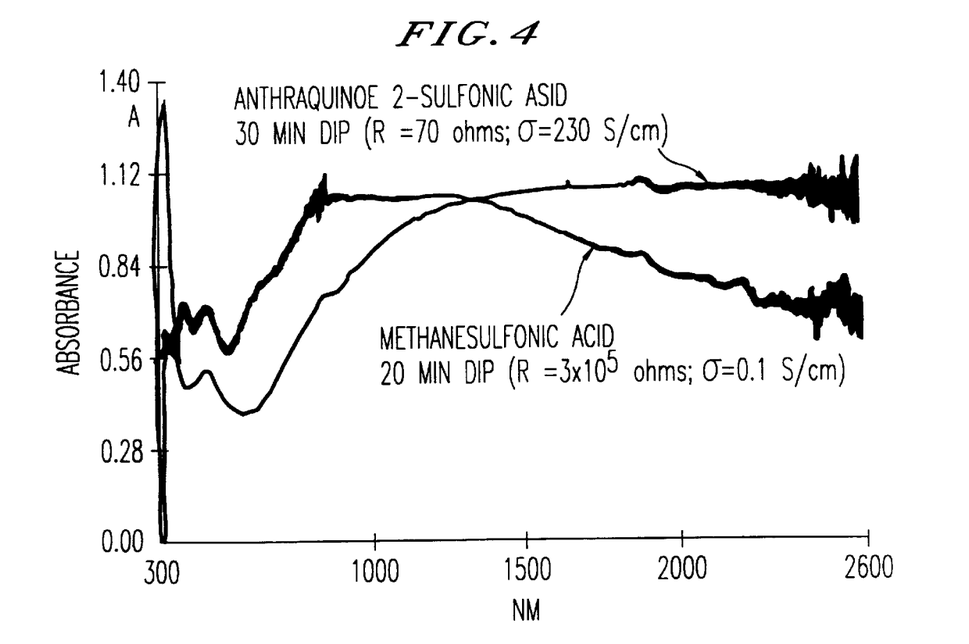
FIG. 4 shows the optical absorption and conductivity for substrates with various dopants.

Polypyrrole was deposited on PET/FEP substrate using the in-situ process. The electrical conductivity depended greatly on the nature of the dopant anion. The conductivity was about 0.1 S/cm when the dopant was methanesulfonate while it was much higher (about 230 S/cm) when anthraquinone-2-sulfonate ion was the dopant (FIG. 4). The optical transparency for the film with the highest conductivity was about 62% on PET and about 78% for FEP.

EXAMPLE 4

Patterned Attachment of Polyaniline on FEP

Figure 5:
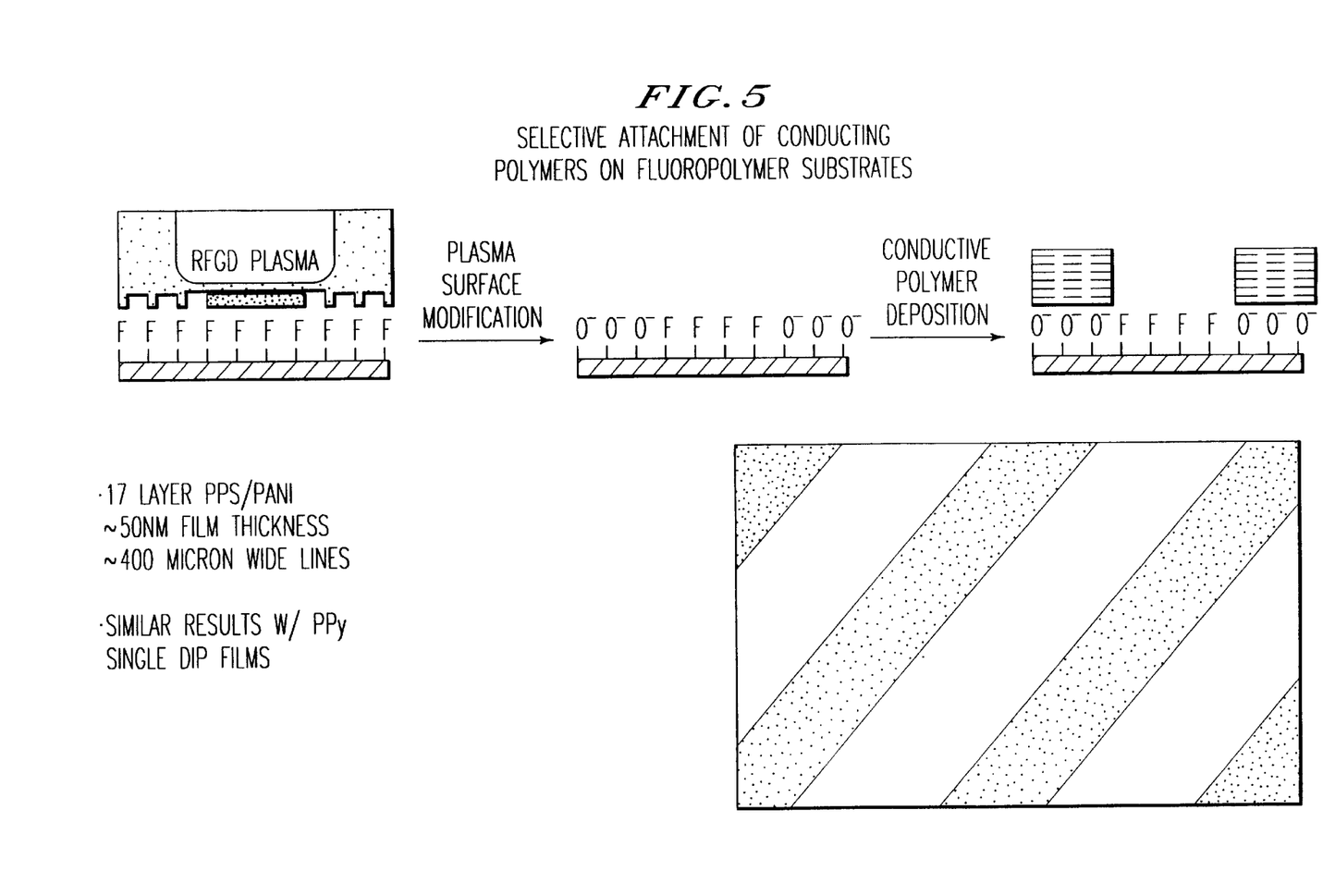
FIG. 5 shows the patterned attachment of polyaniline on fluorinated ethylene propylene.

For fabrication of addressable passive matrix liquid crystal devices from conducting polymer substrates, it is essential to deposit conducting polymer films in patterns. Hexafluoroproylene-co-tetrafluoroethylene (fluorinated ethylene propylene) or FEP materials were modified as per *Science,* 262, 1711 (1993), *Langmuir,* 8, 130 (1992) and *J. Polym. Sci. Part A. Polym. Chem.* 29, 555 (1991), all incorporated herein by reference to achieve selective adsorption of both polyaniline and polypyrrole to only modified areas of the FEP film. FIG. 5 illustrates the deposition of polyaniline to 400 μm regions bordered by 450 μm regions of unmodified FEP. Thus the creation of a patterned conducting polymer surface suitable for display devices is demonstrated. It should also be mentioned that other surface patterning methods are also known and can be applied for producing patterns of conducting polymers. See, for example, J. Vac. Sci. Tech., 11, 2155 (1993) and U.S. Pat. No. 5,079,600, both incorporated herein by reference.

EXAMPLE 5

PDLC Device From Polypyrrole Films on PET

Figure 6:
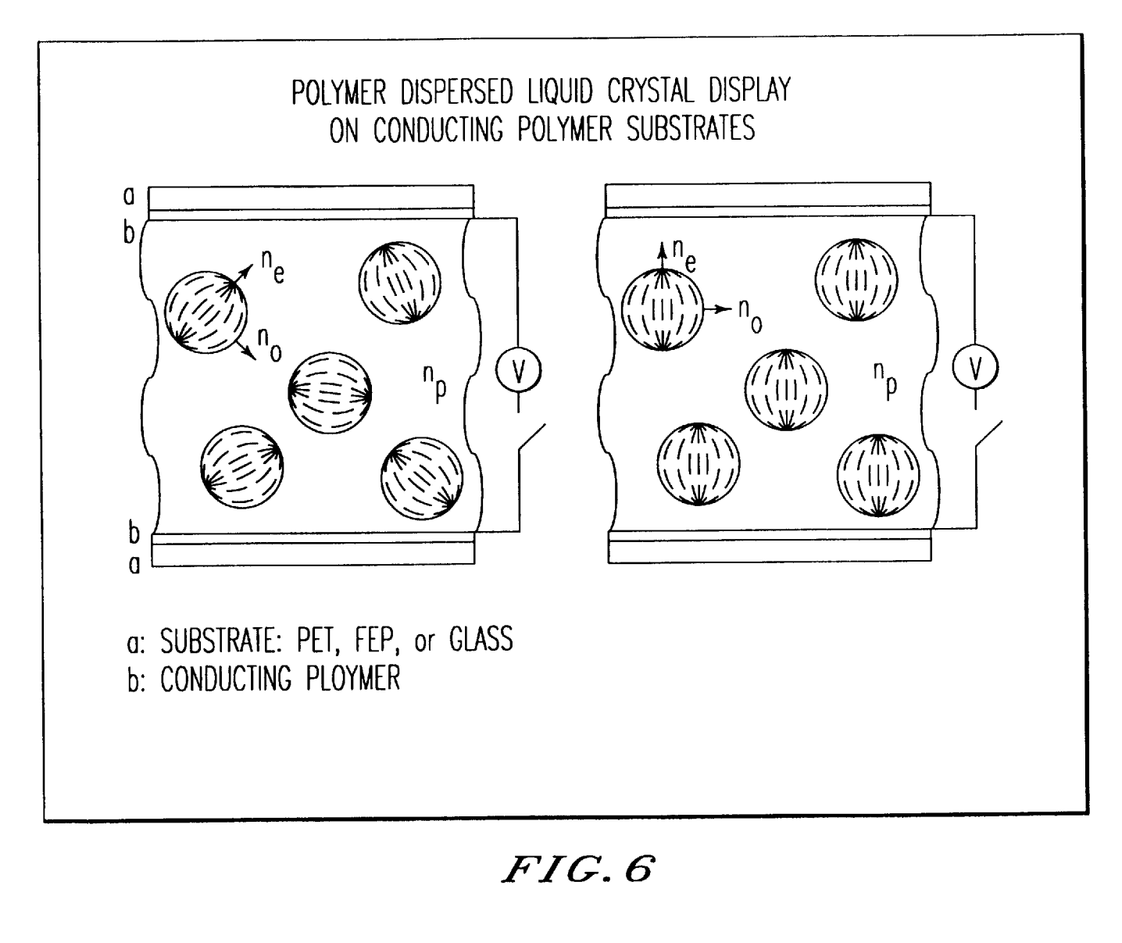
FIG. 6 shows a PDLC device using conducting polymer-coated substrates according to the invention as electrodes.

A PDLC device was fabricated using polypyrrole coated PET as described in Ex 2. A schematic diagram of this device (the diagram is generic for any type of conducting polymer film) is shown in FIG. 6. The electrically conducting surfaces by which the voltage is applied to the device are conducting polymer films. Thus, the ITO coated glass or plastic conducting substrates of typical PDLC devices are replaced by conducting polymer films in the present invention.

Figure 7:
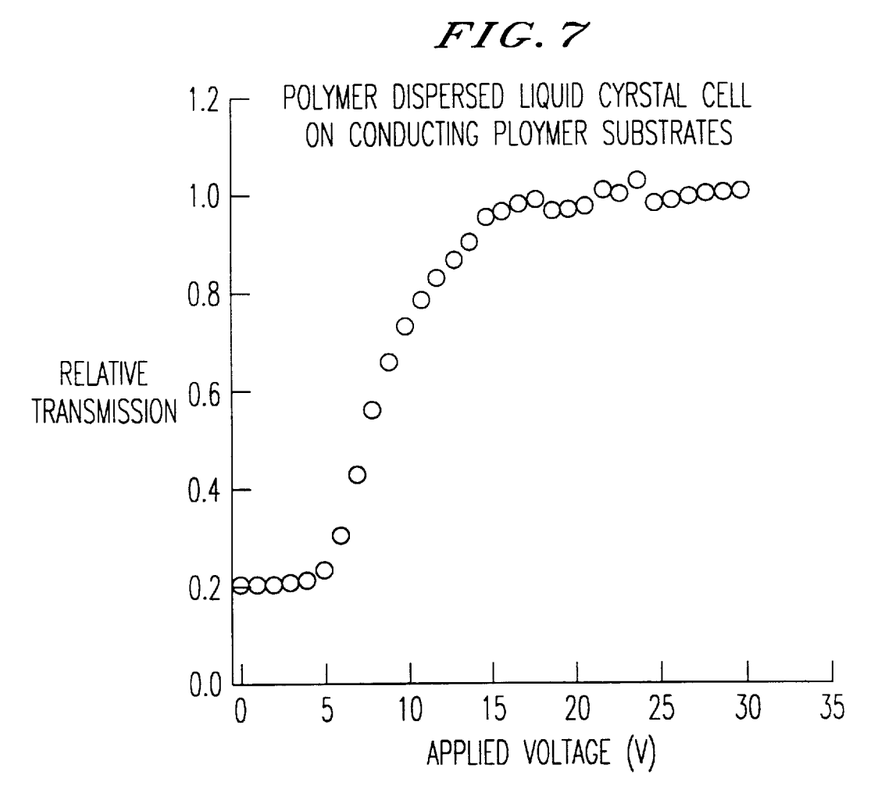
FIG. 7 shows the voltage dependent transmission of the PDLC device of Example 4.
Figure 8:
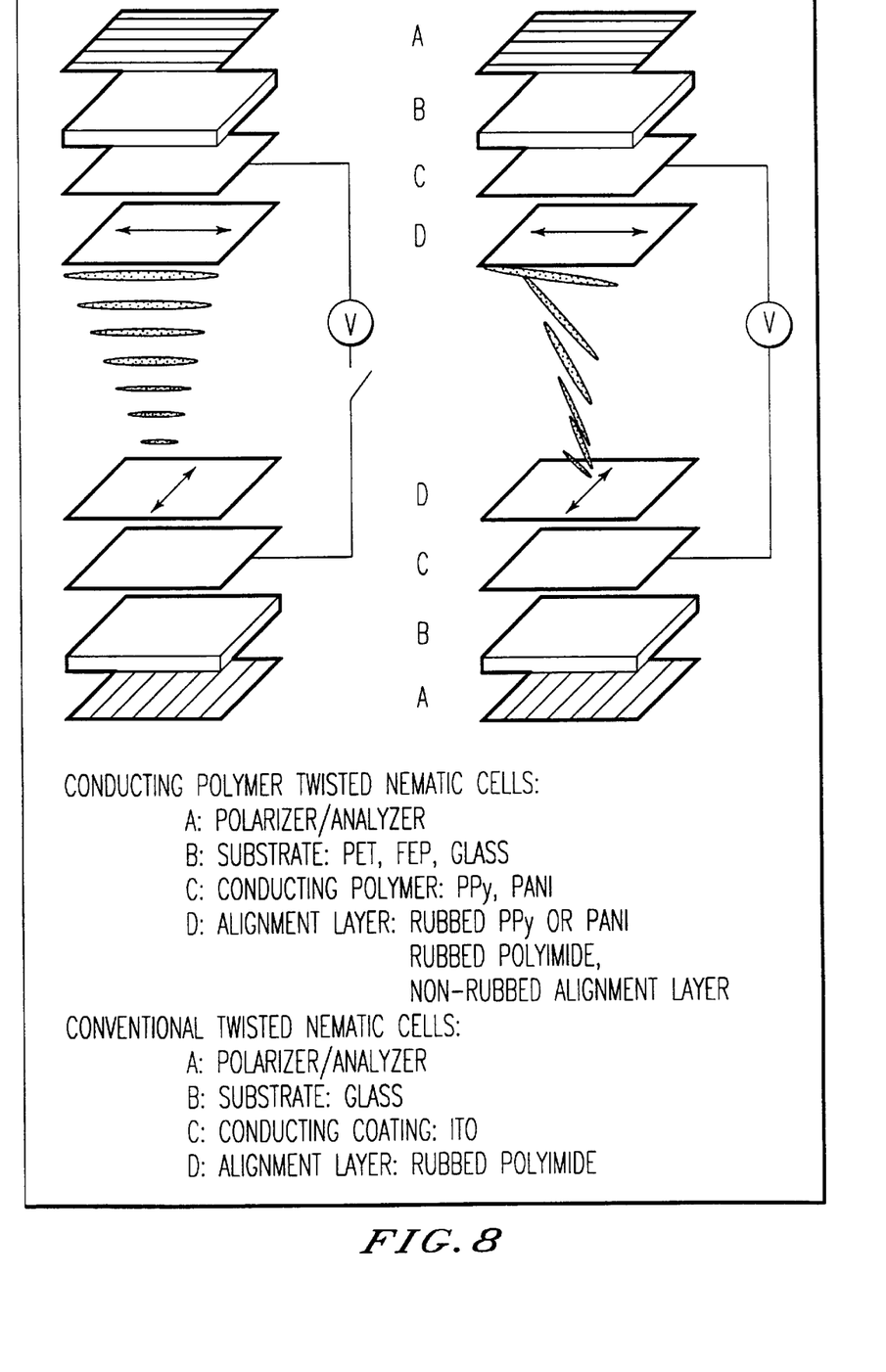
FIG. 8a shows the TN cell of Example 5.
FIG. 8b shows the electro-optical characteristics of the TN cell of Example 5.
Figure 9:
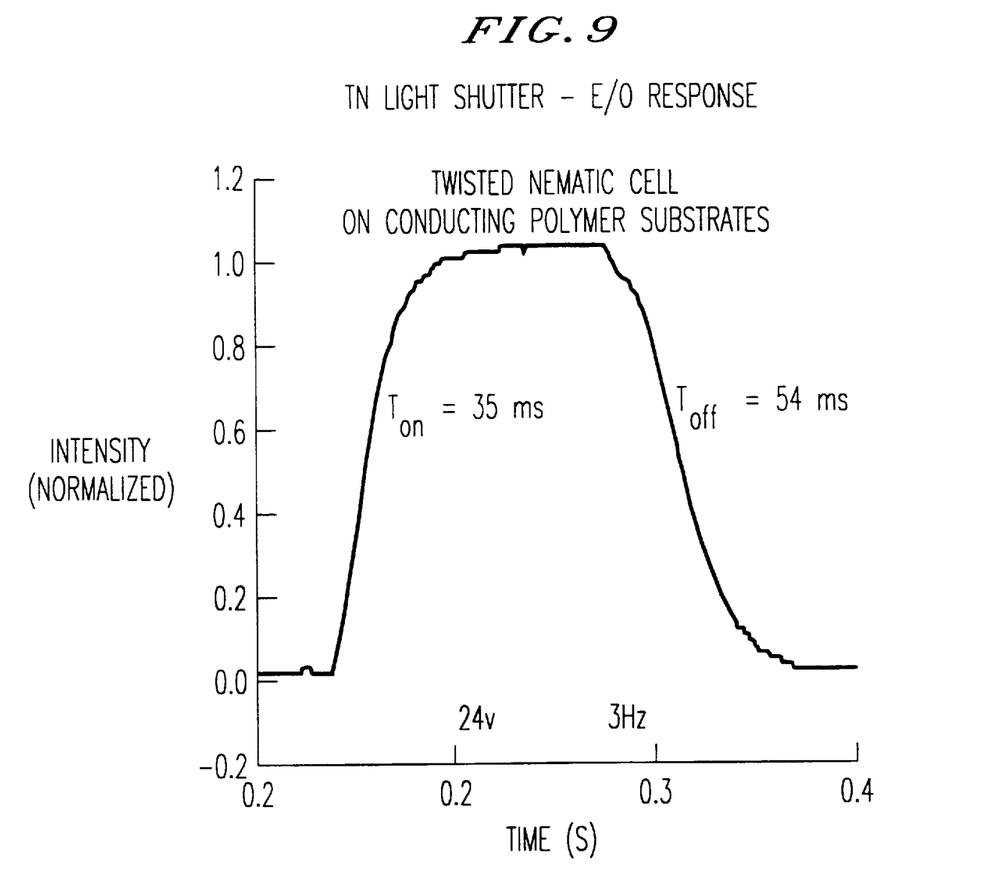

The conducting polymer (polypyrrole) coated PET was cut into strips of appropriate size (eg, 5×5 cm$^2$) for the PDLC cell fabrication. To be able to control the spacing of the cell between the electrodes, one of the substrates was treated with 15 micron mylar spacers. The PDLC device was fabricated by mixing equal weight percentages of eutectic nematic liquid crystal mixture E7 (EM Chemicals) and UV curable optical adhesive, Norland Optical Adhesive #65. The ordinary refractive index of the liquid crystal is nearly equal to that of the polymer (n=1.524), a prerequisite to fabricating a PDLC light shutter. Before polymerization of the Norland adhesive, the liquid crystal was dissolved in a prepolymer and a small amount of this homogeneous mixture was placed on the conducting polymer substrate with the spacers. The substrates were placed on top of each other with the conducting surfaces facing toward the inside of the cell with a small offset, such that electrical contact can be made. The sample was photopolymerized for approximately twenty minutes in UV light (360 nm). As the pre-polymer moiety polymerized, the low molecular weight liquid crystal was no longer soluble in the polymer binder and it phase separated out of the polymer binder. Liquid crystal droplet morphology forms. The PDLC device, fabricated in this manner using the polypyrrole film as the conducting substrate, exhibited electro-optic switching. The voltage dependence of the intensity of transmission of the PDLC device with polypyrrole substrates showed a threshold voltage of about 15 volts beyond which the intensity attains a saturation value (FIG. 7). This behavior, the qualitative nature of the variation of the intensity with applied voltage, as well as the magnitude of the threshold voltage, are very similar to those in currently used PDLC devices with ITO based substrates.

EXAMPLE 6

Twisted Nematic (TN) Device From Polypyrrole Films on PET

A TN cell using polypyrrole films deposited on PET as in Ex. 2 was fabricated. The cell consists of two conducting substrates, two polarizes, spacers to control the cell thickness, and eutectic nematic liquid crystal material (E7). The conducting polypyrrole substrates were treated (unidirectional rubbed with filter paper) to create uniform parallel alignment. The substrates were sandwiched together with the conducting sides facing each other, a small offset to allow for electric connections, and with the alignment direction at the top substrates rotated at 90° with respect to the bottom substrates. Spacers (usually 3–10 microns) were placed in between the substrates so as to control the cell thickness. The two opposing side edges were sealed with an epoxy glue and the liquid crystal was capillary filled into the cell. Placing the cell between crossed polarizers completes the fabrication process of the TN display.

The electro-optic characteristics of the TN device, fabricated using conducting polymer (polypyrrole) films deposited on PET as the electrode surfaces were investigated. Typical curves showing the electro-optic response for a TN cell (approximately 10 microns thick) are shown in FIG. 7. The applied voltage was 24 volts across the thickness of the cell. The rise time and the off-time, evaluated from the value of the optical intensity at 10% and 90% of the intensity, are 35 ms and 54 ms. Thus, the functioning and the characteristics of a working TN device fabricated with an optically transparent conducting polymer as the conducting substrate has been demonstrated. An important feature of this device is that the conducting polymer film not only acts as the conducting substrate but also as the aligning layer. Thus, the conducting polymer film replaces the ITO substrates as well as the polyimide aligning layer used in conventional devices. This reduces the steps involved in the device fabrication.

EXAMPLE 7

PDLC Device From Polyaniline Films Deposited on PET

The fabrication procedure was the same as that used for the polypyrrole-based PDLC device described as Example 4. The thickness of the PDLC device was 18 microns. Electro-optical switching was clearly observed. The applied voltage (200 volts across 18 microns) was higher than that used for the polypyrrole-based PDLC device. This is due to a higher surface resistance of the polyaniline films compared to polypyrrole films on the same PET substrate. Other than this difference, all the electro-optic characteristics of the polyaniline based PDLC device were similar to the polypyrrole-based PDLC device described in Example 4.

EXAMPLE 8

Twisted Nematic (TN) Device From Polypyrrole Films on Glass

A TN device was fabricated from polypyrrole films deposited on glass. The cell thickness was 8 microns. E7 was the nematic material used. Electrooptic switching was observed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A display device, comprising a substrate, a conducting polymer on a surface of said substrate, and a lead electrically connected to said conducting polymer, wherein said conducting polymer has a conductivity of 100 to 5×10$^3$ S/cm.

2. The device of claim 1, further comprising a voltage source electrically connected to said conducting polymer.

3. The device of claim 1, wherein a liquid crystalline material is in contact with said conducting polymer either directly or through a dielectric passivating layer.

4. The device of claim 3, further comprising a voltage source electrically connected to said conducting polymer.

5. The device of claim 1, wherein said conducting polymer forms a pattern on the surface of the substrate.

6. The device of claim 2, wherein said conducting polymer forms a pattern on the surface of the substrate.

7. The device of claim 1, wherein said substrate is polymeric and wherein said conducting polymer is selected from the group consisting of polyaniline, polypyrrole, and polythiophene, with or without a dopant salt.

8. The device of claim 1, wherein said substrate is flexible.

9. The device of claim 1, wherein said substrate is glass, polyethyleneterephthalate, mylar or fluorinated ethylene propylene.

10. The device of claim 1, wherein said substrate consists of polymeric material.

11. The device of claim 3, wherein said substrate is flexible.

12. The device of claim 1, wherein said conducting polymer has a conductivity of 100 to 380 S/cm.

13. The device of claim 11, further comprising a voltage source electrically connected to said lead.

14. The device of claim 1, wherein a liquid crystalline material is in contact with said conducting polymer either directly or through a dielectric passivating layer.

15. The device of claim 12, wherein said conducting polymer forms a pattern on said surface of said substrate.

16. The device of claim 12, wherein said substrate is polymeric and wherein said conducting polymer is selected from the group consisting of polyaniline, polypyrrole, and polythiophene, with or without a dopant salt.

17. The device of claim 16, wherein said conducting polymer comprises a dopant salt.

18. The device of claim 11, wherein said substrate is flexible.

19. The device of claim 11, wherein said substrate is selected from the group consisting of glass, polyethyleneterephthalate, mylar, and fluorinated ethylene propylene.

20. The device of claim 1, wherein said conducting polymer has a conductivity of 232 to $5 \times 10^3$ S/cm.

21. The device of claim 12, wherein said substrate consists of a polymeric material.

22. The device of claim 3, wherein a liquid crystalline material is in contact with said conducting polymer directly.

23. The device of claim 3, wherein a liquid crystalline material is in contact with said conducting polymer through a dielectric passivating layer.

24. The device of claim 3, wherein said conducting polymer forms a pattern on said surface of said substrate.

25. The device of claim 3, wherein said conducting polymer is selected from the group consisting of polyaniline, polypyrrole, and polythiophene, with or without a dopant salt.

26. The device of claim 13, wherein a liquid crystalline material is in contact with said conducting polymer either directly or through a dielectric passivating layer.

27. The device of claim 13, wherein a liquid crystalline material is in contact with said conducting polymer directly.

28. The device of claim 13, wherein a liquid crystalline material is in contact with said conducting polymer through a dielectric passivating layer.

29. The device of claim 13, wherein said conducting polymer forms a pattern on said surface of said substrate.

30. The device of claim 13, wherein said conducting polymer is selected from the group consisting of polyaniline, polypyrrole, and polythiophene, with or without a dopant salt.

31. The device of claim 13, wherein said substrate is flexible.

32. The device of claim 13, further comprising a voltage source electrically connected to said lead.

33. The device of claim 15, further comprising a voltage source electrically connected to said lead.

34. The device of claim 15, wherein said conducting polymer forms a pattern on said surface of said substrate.

35. The device of claim 15, wherein a liquid crystalline material is in contact with said conducting polymer directly.

36. The device of claim 15, wherein a liquid crystalline material is in contact with said conducting polymer through a dielectric passivating layer.

37. The device of claim 15, wherein said conducting polymer is selected from the group consisting of polyaniline, polypyrrole, and polythiophene, with or without a dopant salt.

38. A The device of claim 15, wherein said substrate is flexible.

* * * * *